UNITED STATES PATENT OFFICE.

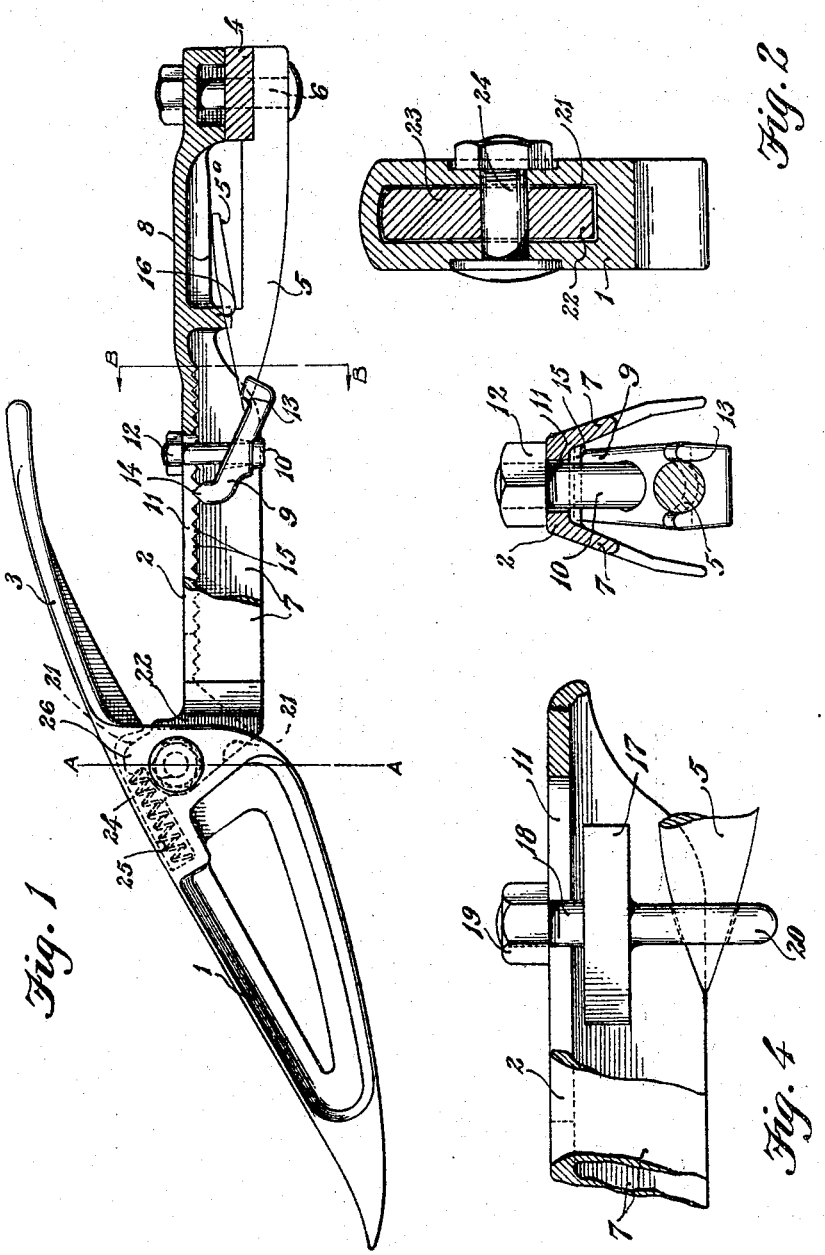

CHARLES E. MERKEL, OF MARION, OHIO.

LIFTING-GUARD FOR HARVESTERS.

1,202,084. Specification of Letters Patent. Patented Oct. 24, 1916.

Application filed January 31, 1916. Serial No. 75,204.

*To all whom it may concern:*

Be it known that I, CHARLES E. MERKEL, a citizen of the United States, residing at Marion, in the county of Marion and State of Ohio, have invented certain new and useful Improvements in Lifting-Guards for Harvesters, of which the following is a specification, reference being had therein to the accompanying drawing.

This invention relates to lifting guards for harvesters.

The ordinary guards, or teeth, of the finger-bar of a harvesting machine will not lift grain that is "down," or lies close to the ground, and it has been proposed to provide the finger-bar with a series of supplemental guards spaced apart along its length and arranged to lift the grain above the finger-bar so that it can be cut.

The object of the present invention is to provide a lifting guard of this character which will be of such a construction and will be connected with the finger-bar in such a manner that the thrust of the grain will be imposed directly upon the finger-bar, and the guard of the finger-bar will not be subjected to severe strain; and to this end it is also an object of the invention to provide improved means for connecting the lifting guard to the finger-bar.

It is also an object of the invention to so construct the lifting guard that it will be held in operative engagement with the ground by its own weight, thus eliminating the use of springs.

In the accompanying drawings Figure 1 is a side elevation of a lifting guard embodying my invention, partially broken away and showing the finger-bar in section; Fig. 2 is a sectional view taken on the line *a—a* of Fig. 1; Fig. 3 is a sectional view taken on the line *b—b* of Fig. 1; looking in the direction of the arrows; and Fig. 4 is a detail view of a slightly modified form of the clamp for securing the lifting guard to the small guard in the finger-bar.

In these drawings I have illustrated one embodiment of my invention and have shown the lifting guard as comprising two parts, a body portion, or guard proper, as indicated at 1, and a supporting arm 2 by means of which the body portion of the guard is connected with the finger-bar. The body portion of the guard is tapered forwardly so as to form a long pointed end lying close to the ground and adapted to be moved beneath the grain which is down, or under other crops which lie close to the ground, such as peas and alfalfa. The upper edge of the body portion of the guard slopes upwardly and rearwardly as shown, and is provided at its rear end with a rearwardly extending projection 3, which serves to further elevate the grain and to support the same until the small guards, or guard teeth, of the finger-bar have been moved beneath the same. The arm 2 is so constructed and arranged that it can be connected with the finger-bar, which is shown at 4, and with the small guard, or guard finger 5, above the same, and the connection between the arm 2 and the body portion 1 of the lifting guard is so arranged that the thrust on the lifting guard will be transmitted through the arm to the finger-bar without imposing any substantial strain upon the guard 5. The supporting arm 2 is preferably formed in a single piece, and as here shown has its rear end shaped to fit upon the upper surface of the finger-bar 4 and apertured to receive a connecting bolt 6 by means of which the arm is secured to the cutter-bar. Preferably a single bolt is used for connecting the supporting arm 2 and the guard 5 to the finger-bar and in practice the short bolt by means of which the guard 5 is usually connected with the finger-bar is removed and another bolt substituted therefor, which is long enough to extend through the supporting arm 2 as well as through the other parts. The supporting arm is connected with the guard 5 of the finger-bar near the forward end of the latter, this connection being preferably formed by means of a clamp and the supporting arm being shaped to bridge the guard 5. As here shown the connecting arm is provided with depending flanges 7 along the opposite edges thereof and converging toward the top of the arm. These flanges are cut away near the rear end of the arm, as shown at 8, and if desired the body of the arm may be raised slightly, as shown, to enable the same to clear the rear portion of the guard 5 of various types of harvesters, it being understood that the term harvester is employed herein in a broad sense and is meant to include machines of various kinds employing a cutter-bar of a type to which this invention is applicable. The clamp, by means of which the supporting arm is connected with the forward end of the guard 5, may be of various kinds but I prefer the one shown in Figs. 1 and 3, which is adjustable to accommodate it to finger-bar guards of various kinds and sizes. As here shown this clamp comprises a clamping member, or bar, 9, supported by a bolt 10, which extends through a slot 11, formed in the upper portion of the supporting arm, in which it is held by a nut 12. The aperture in the clamping bar 9, through which the bolt 10 passes, is of such a size as to permit the clamping bar to have a limited pivotal movement on the bolt, but to cause the bar to be supported by the head of the bolt, as shown. The rear end of the clamping bar is provided with a seat 13, which is formed by providing the arm with an upwardly extending portion which is recessed to receive the tapered end of the guard 5 of the finger-bar. The forward end of the clamping bar is turned upward and provided with a nose 14 adapted to engage between teeth 15 formed in the under surface of the upper portion of the supporting arm. The supporting arm is provided at a point in the rear of the slot 11 with a depending lug 16 which bears upon the guard 5 of the finger-bar in advance of the wing 5ᵃ of that guard, and serves to hold the supporting arm out of contact with the wing and prevent the latter from being distorted by undue pressure on the clamping device; and it also coöperates with the clamping bar 9 to secure the supporting arm firmly to the end of the guard 5.

It will be apparent that in placing the lifting guard on the finger-bar, it is first attached to the finger-bar by means of a bolt 6, washers being interposed between the end of the arm and the finger-bar, if necessary, to secure proper alinement, and the clamp is then slipped rearwardly along the slot 11 until the seat 13 thereof is in proper engagement with the end of the guard 5. By then tightening the nut 12, the rear end of the clamping bar is moved upward against the tapered end of the guard 5 and the latter is clamped firmly between the clamping bar and the lug 16, which forms a part of the supporting arm, thus forming a very rigid connection between the supporting arm and the guard 5. This connection is such that the lifting guard may be applied to harvesters the finger-bar guards of which differ radically in size and shape, thus giving the lifting-guard a wide field of utility.

In Fig. 4 I have shown a modified form of clamp which in some instances may be desirable. As here shown the clamping member comprises a wedge shaped block 17 adapted to fit snugly between the depending flanges 7 of the supporting arm and having secured thereto, and in the present instance formed integral therewith, a threaded lug, or bolt, 18, which extends through the slot 11 in the supporting arm and is provided with a nut 19 by means of which the wedge can be drawn snugly into engagement with the flanges and a very rigid connection secured. The clamp is provided with a seat to receive the forward end of the guard finger 5 and this seat is preferably formed by providing th clamping block 17 with a depending portion 20 having a tapered aperture to receive the tapered end of the guard 5. By slipping the clamping device rearwardly until the depending portion 20 thereof is seated firmly on the end of the guard 5 and then tightening the nut 19 to secure the clamp rigidly into position, a very firm connection may be had between the guard 5 and the supporting arm of the lifting guard.

The body portion 1 of the lifting guard is pivotally mounted on the forward end of the arm 2 so as to permit the guard to accommodate itself to the irregularities of the surface of the ground and to rise over stones or other obstructions which it may encounter. Preferably, the connection between the body portion of the guard and the supporting arm is above the plane of the finger-bar, and as here shown the connection is formed at the rear end of the body portion of the guard and near the upper edge thereof, the rear edge of the body portion being recessed or provided with a socket, as shown at 21, to receive the forward end of the arm 2, which is reduced in width, as shown at 22, to enable it to enter the recess, or socket. This forward end of the arm is preferably provided with an upwardly extending portion, or projection, 23, through which extends a bolt 24 by means of which the body portion of the guard is connected with the arm. By arranging the axis of the connection between the body of the guard and the supporting arm above the plane of the finger-bar and arranging the arm above the guard 5, the thrust on the lifting guard is transmitted through the arm 2 directly to the finger-bar and the guard 5 is relieved of a large part of the strain to which it would otherwise be subjected, and especially is it relieved of the downward prying strain to which it is subjected when its forward end is connected with the arm of a guard arranged beneath the same. While the construction and arrangement of the lifting guard is such that the body portion thereof will under ordinary conditions be held in engagement with the ground by its own weight, it is possible that under certain working conditions it may be desirable to provide a spring to hold the point of the lifting guard more firmly in engagement with the ground, and I have shown the body portion of the lifting guard as provided with a socket 25 in which a coiled spring may be mounted, and I have shown the forward end 23 of the supporting arm as having a lug 26 to engage the rear end of the spring. The spring is not here shown as its use is not contemplated under ordinary working conditions.

It will be apparent from the foregoing description that I have provided a lifting guard which is very simple in its construction, which comprises a minimum number of parts, and which is so constructed and connected with the finger-bar of the harvester as to impose the greater portion of the strain to which it is subjected upon that bar and thus relieve the guard of the finger-bar from undue strain. Further it will be apparent that the supporting arm is so arranged above the guard of the finger-bar as to prevent the grain from entering the guideway of the guard and interfering with the operation of the cutter. Further it will be apparent that I have provided a very efficient and rigid clamping device for connecting the lifting guard with the guard of the finger-bar, this clamping device being adjustable to different sizes of guards and when tightened forming a very firm connection between the supporting arm and the guard. Further it will be apparent that the connection between the body portion of the lifting guard and the supporting arm is so arranged that the point of the lifting guard will of its own weight be held firmly in engagement with the ground, thereby eliminating the use of springs.

While I have shown one embodiment of my invention, I wish it to be understood that I do not care to be limited to the details of construction shown and described as obvious modifications will occur to a person skilled in the art.

Having now fully described my invention, what I claim as new, and desire to secure by Letters Patent is:—

1. In a harvester, the combination with a finger bar having a guard finger, of a lifting guard comprising a forwardly tapered guard member having its forward end arranged close to the ground, and a one-piece supporting arm arranged above said guard finger and said finger bar and having its rear end secured to said finger bar, said supporting arm having at its forward end an upwardly extending portion to which said guard member is pivotally secured on an axis above the plane of the upper surface of said supporting arm, and a clamp adjustably mounted on said arm between its ends and having a part arranged beneath said arm to engage the end of said guard finger and clamp the same rigidly to said supporting arm.

2. In a harvester, the combination with a finger bar having a guard finger, of a lifting guard comprising a forwardly tapered guard member having its forward end arranged close to the ground, and a supporting arm arranged above said guard finger and said finger bar and having its rear end secured to said finger bar, said supporting arm having at its forward end an upwardly extending portion to which said guard member is pivotally secured on an axis above the plane of the upper surface of said supporting arm, a connecting device comprising a bolt mounted on said supporting arm between the ends of the latter for adjustment lengthwise thereof, a clamping bar pivotally mounted on said bolt beneath said arm and having parts extending on opposite sides of said bolt, the rear part of said clamping bar having a seat to receive the end of said guard finger, and the forward part of said clamping bar being arranged to engage the adjacent surface of said supporting arm, and a nut on said bolt to draw said clamping bar toward said arm and cause the rear end of said clamping bar to rigidly clamp said arm to said guard finger.

3. In a harvester, the combination with a finger bar having a guard finger, of a lifting guard comprising a forwardly tapered guard member having its forward end arranged close to the ground, and a supporting arm arranged above said guard finger and said finger bar and having its rear end secured to said finger bar, said supporting arm having at its forward end an upwardly extending portion to which said guard member is pivotally secured on an axis above the plane of the upper surface of said supporting arm, a connecting device comprising a bolt mounted on said supporting arm between the ends of the latter for adjustment lengthwise thereof and a clamping bar pivotally mounted on said bolt beneath said arm and having parts extending on opposite sides of said bolt, the rear part of said clamping bar having a seat to receive the end of said guard finger and the forward part of said clamping bar being arranged to engage the adjacent surface of said supporting arm, and a nut on said bolt to draw said clamping bar toward said arm and cause the rear end of said clamping bar to rigidly clamp said arm to said guard finger, said supporting arm being provided with teeth and the forward portion of said clamping bar having a nose to engage the teeth of said arm to hold said bar rigidly against longitudinal displacement.

4. In a harvester, the combination with a finger-bar having a guard-finger, of a lifting guard comprising a forwardly tapered body portion having its tapered end arranged close to the ground, a supporting arm pivotally connected with said body portion on an axis above the plane of said finger-bar and said guard-finger, said arm being constructed to fit over said guard-finger and to extend above said finger-bar and having a depending portion arranged to engage said guard-finger, means to secure said arm to said finger-bar, and a clamp adjustably mounted on said supporting arm between its ends and having a part to engage the under side of said guard-finger near the forward end thereof and to draw the same firmly against that part of said supporting arm which is in engagement therewith.

5. In a harvester, the combination with a finger bar having a guard finger, of a lifting guard comprising a forwardly tapered guard member having its forward end arranged close to the ground, a supporting arm arranged above said guard finger and said finger bar and having its rear end secured to said finger bar, a pivotal connection between said supporting arm and said guard member, a connecting device comprising a bolt mounted on said supporting arm between the ends of the latter for adjustment lengthwise thereof, a clamping bar pivotally mounted on said bolt beneath said arm and having parts extending on opposite sides of said bolt, the rear part of said clamping bar having a seat to receive the end of said guard finger, and the forward part of said clamping bar being arranged to engage the adjacent surface of said supporting arm, and a nut on said bolt to draw said clamping bar toward said arm and cause the rear end of said clamping bar to rigidly clamp said arm to said guard finger.

6. In a harvester, the combination with a finger bar having a guard finger, of a lifting guard comprising a forwardly tapered guard member having its forward end arranged close to the ground, a one piece supporting arm arranged above said guard finger and said finger bar and having its rear end secured to said finger bar, a pivotal connection between said supporting arm and said guard member, a connecting device comprising a bolt mounted on said supporting arm between the ends of the latter for adjustment lengthwise thereof, a clamping member mounted on said bolt beneath said arm and having a part arranged to engage beneath the forward end of said guard finger, and a nut on said bolt to draw said clamping member toward said arm and cause said clamping bar to rigidly clamp said arm to said guard finger.

7. In a harvester, the combination with a finger bar having a guard finger, of a lifting guard comprising a forwardly tapered guard member having its forward end arranged close to the ground, a supporting arm arranged above said guard finger and said finger bar and having its rear end secured to said finger bar, a pivotal connection between said supporting arm and said guard member, a clamping member mounted beneath said arm and having a part to engage beneath the forward end of said guard finger, and a connecting device having pivotal connection with said clamping member, adjustably mounted on said arm for movement toward and away from said finger bar independently of said guard member, and having means to draw said clamping member toward said arm.

8. In a harvester, the combination with a finger bar having a guard finger, of a lifting guard comprising a guard member and a supporting arm, means for securing said arm to said finger bar, said guard member having in its rear edge a recess open at its rear end only, and said arm having a reduced portion extending into said recess, means for pivotally connecting the reduced portion of said arm to said guard member, the recess in said guard member having a forwardly extending portion arranged near the upper edge thereof and adapted to receive a spring, and that portion of said arm which extends into said recess having above its axis an upwardly extending lug arranged within the recess and in alinement with said forwardly extending portion to enable it to engage the spring mounted within the same.

In testimony whereof, I affix my signature hereto.

CHARLES E. MERKEL.

Copies of this patent may be obtained for five cents each, by addressing the "Commissioner of Patents, Washington, D. C."